May 18, 1965     M. M. LEVY     3,184,061
APPARATUS AND METHOD FOR SORTING FLAT ARTICLES
Filed Feb. 8, 1961     11 Sheets-Sheet 1

INVENTOR
MAURICE M. LEVY
BY
Stevens, Davis, Miller + Mosher
ATTORNEYS

May 18, 1965  M. M. LEVY  3,184,061
APPARATUS AND METHOD FOR SORTING FLAT ARTICLES
Filed Feb. 8, 1961  11 Sheets-Sheet 2

Fig-2

INVENTOR
MAURICE M. LEVY
BY
Stevens, Davis, Miller + Mosher
ATTORNEYS

Fig-3

May 18, 1965 M. M. LEVY 3,184,061
APPARATUS AND METHOD FOR SORTING FLAT ARTICLES
Filed Feb. 8, 1961 11 Sheets-Sheet 4

Fig-4

INVENTOR
MAURICE M. LEVY
BY
Stevens, Davis, Miller + Mosher
ATTORNEYS

May 18, 1965 M. M. LEVY 3,184,061
APPARATUS AND METHOD FOR SORTING FLAT ARTICLES
Filed Feb. 8, 1961 11 Sheets-Sheet 5

FIG-5

INVENTOR
MAURICE M. LEVY
BY
Stevens, Davis, Miller + Mosher
ATTORNEYS

May 18, 1965     M. M. LEVY     3,184,061
APPARATUS AND METHOD FOR SORTING FLAT ARTICLES
Filed Feb. 8, 1961     11 Sheets-Sheet 6

Fig-6

INVENTOR
MAURICE M. LEVY
BY
Stevens, Davis, Miller + Mosher
ATTORNEYS

United States Patent Office 3,184,061
Patented May 18, 1965

3,184,061
APPARATUS AND METHOD FOR SORTING
FLAT ARTICLES
Maurice M. Levy, 208 Clemow Ave., Ottawa,
Ontario, Canada
Filed Feb. 8, 1961, Ser. No. 87,888
4 Claims. (Cl. 209—72)

This invention relates to improvements in apparatus and method for sorting letters, cards and other articles of generally flat rectangular shape.

Sorting systems have already been developed in which the addresses on pieces of letter mail or other data on record cards are first converted into binary or other code designations borne by the letters or cards. The letters or cards are then passed individually past an electronic reader which reads each set of code markings and determines from information stored in a file computer to which sortation outlet the letter or card in question should be conveyed. A compartment is provided at each outlet to receive the letters or cards diverted thereto and to form these letters or cards into a stack for subsequent handling. In the specific form of apparatus illustrated and described below a plurality of such outlets is provided, to any of which the system may selectively convey each letter, card or the flat article (hereinafter referred to simply as "articles").

The object of the present invention is to provide improvements in the construction and operation of such apparatus, and particularly to provide apparatus that is more versatile in operation than any hitherto developed.

In particular, it is an object of the invention to provide apparatus in which a series of sorting breakdowns can be performed on a machine which is compact and economical in the space that it occupies and the volume of equipment that it incorporates, and yet will operate at a high throughput.

Further objects and advantages of the invention will appear as the description proceeds.

Figure 1:
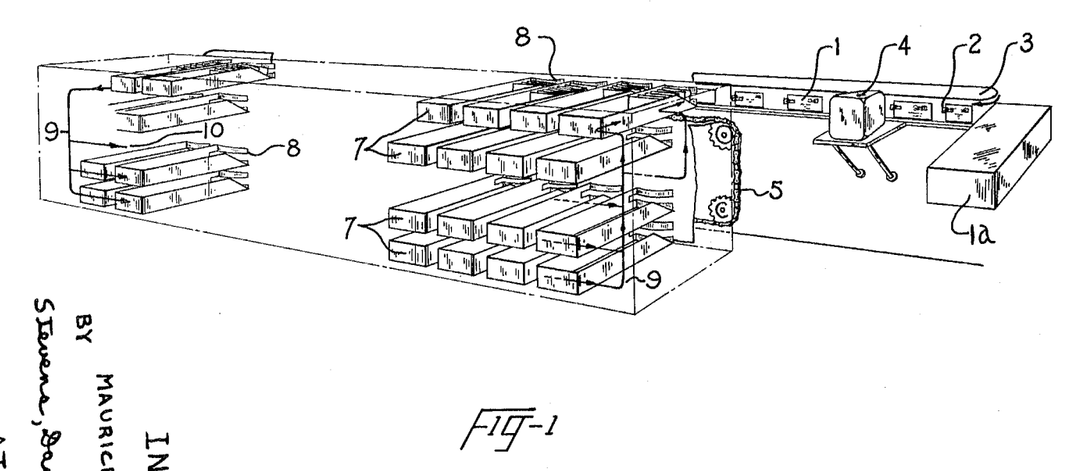
FIGURE 1 is a side perspective general view of one form of machine for use in practicing the present invention.

Referring firstly to FIGURE 1, letters 1, which have been marked with code designations of their addresses, are fed one at a time from a letter feeder 1a to a series of letter conveyors or "traps" 2 mounted to travel with an endless belt conveyor 3. The belt 3 carries the traps 2 with their associated letters 1 past an electronic reader 4 which reads the code markings on the letters and determines from the information stored in a file computer (not shown) the outlet to which the letter in question is to go. At each outlet there is situated a suitable accumulator to accumulate the letters received. The file computer selects the required outlet to which each letter 1 scanned by the reader 4 is to be conveyed, and, at the correct time in the sequence of travel of the belt, actuates a movable setting cam to guide the letter trap through the required accumulator to deposit its letter therein. These parts form no part of the present inventive advance and consequently will not be further described in detail. For further information concerning the manner of operation of such apparatus attention is directed to my United States patent application No. 56,925 filed September 19, 1960, now Patent No. 3,129,824. For additional background reference may also be had to United States Patent No. 2,925,586 issued February 19, 1960, my United States patent application No. 421,644 filed April 7, 1954 (Canadian Patent No. 539,092), and "Automation in Post Offices," volume XI, Proceedings of the National Electronics Conference, October, 1955. For an example of a feeder of a type suitable for use as the feeder 1a, reference is made to my United States patent application Serial No. 856,269 filed November 30, 1959, now Patent No. 2,995,362, issued August 8, 1961.

In the construction shown in FIGURE 1, the accumulators take the form of a plurality of rows of trays 7 arranged in tiers beside the fixed structure supporting the belt 3. The top row of trays 7 is disposed at a sorting station horizontally aligned with the belt 3, while the remaining rows are housed in storage stations at lower levels. The trays at the sorting station are movable towards the belt 3 into the position shown in FIGURE 1 in which their letter-collecting fingers 8 project into the path of travel of a letter trap 2 when deflected slightly out of its main path of travel towards the selected tray 7 in the manner described in said application No. 56,925. Whenever it is desired that this row of trays 7 at the sorting station should receive no more letters, such trays are moved back from the path of travel of the letter traps and are transferred, as indicated generally by the arrows 9 in FIGURE 1, to an empty storage station such as shown at 10 in FIGURE 1. At the same time this removed row will be replaced by another row of trays taken from a storage tier, the replacement row being made up of empty trays, or partially filled trays, as desired.

Figure 2:
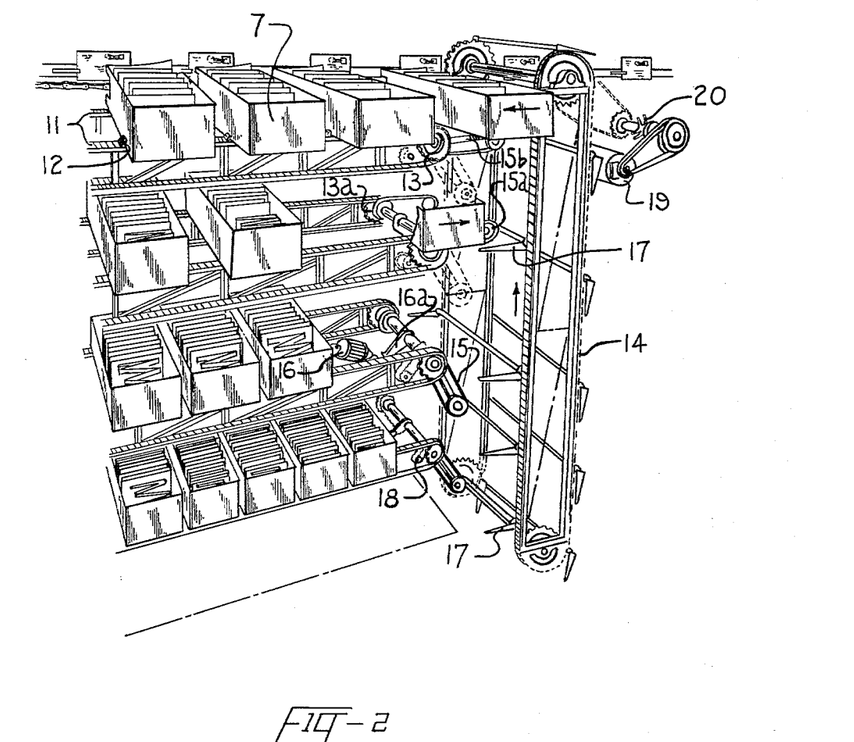
FIGURE 2 is a view showing a portion of the apparatus of FIGURE 1 in more detail.
Figure 3:
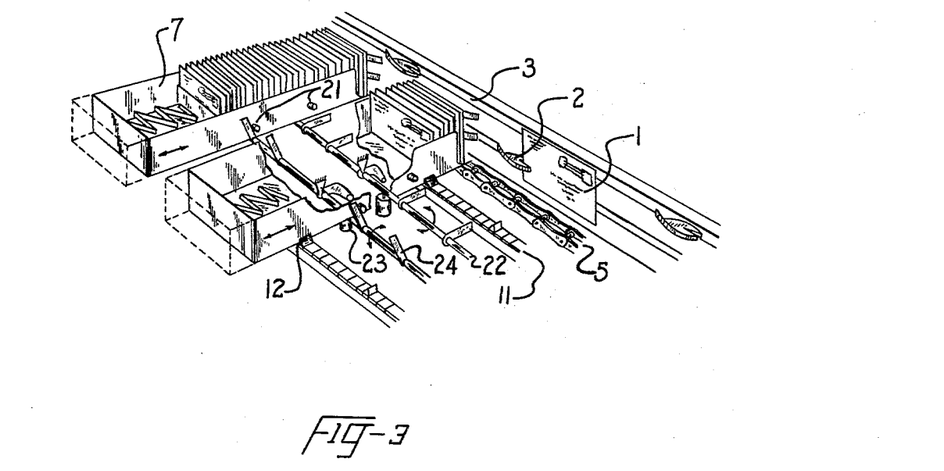
FIGURE 3 is a fragmentary perspective view of a part of the apparatus of FIGURE 2.

FIGURES 2 and 3 show one form of means for carrying out this operation illustrated only generally in FIGURE 1. The trays 7 will be seen to be mounted side by side on horizontally extending endless chains 11, longitudinal sliding of the trays being prevented by stops 12. Each of the chains 11 extends around a driving sprocket 13. At each end of the apparatus, adjacent the ends of the horizontal conveyors which the chains 11 constitute, there is mounted a vertical conveyor consisting primarily of a pair of vertically disposed conveyor chains 14 and arms 17 projecting therefrom. Only the vertical conveyor at one end of the horizontal conveyors is shown in FIGURE 2, but it is to be understood that there will be an identical arrangement at the other end of the chains 11 so that loading and unloading of the trays may be carried out simultaneously and at opposite ends of the apparatus. Such a second vertical conveyor is only preferred, not essential, since all the movements required could be carried out with a single vertical conveyor, provided one storage station empty of trays is provided. Two vertical conveyors adds to the efficiency of the apparatus by eliminating the need for an empty storage station.

A pair of short endless transfer chains 15 is hingedly mounted at the end of each pair of horizontal chains 11. Each pair of transfer chains 15 extends around driven sprockets 13a and idler sprockets 15a carried by an arm 15b pivotally mounted about the axis of the sprockets 13, the position of the arm 15b being controlled by an hydraulically operated cylinder 16 and a crank arm 16a. Operation of each of the cylinders 16 serves to move its associated transfer chain assembly between a lowered, inoperative position (such as shown in the two lower tiers of FIGURE 2) and a projecting, operative position, demonstrated by the transfer chains 15 of the two upper tiers of FIGURE 2. When in this projecting position, each pair of transfer chains 15 forms a continuation of its associated chains 11, and serves to convey the trays 7 into positions in which they may be engaged by the pairs of projecting arms 17 mounted on the vertical chains 14. When it is desired to move a row of trays 7 from a lower tier to a higher tier, the cylinder 16 of the lower tier involved is actuated to place the corresponding transfer chains 15 in their projecting position. The chains 11 and 15 of this tier are then driven by sprockets 13 so that the first tray of the row is moved onto the vertical conveyor. Chains 14 are driven to raise the projecting arms 17 holding the tray to the required level. The transfer chains 15 of the upper, receiving tier are then moved to projection position by their associated cylinder 16, and are driven together with their associated chains 11, so that the trays are conveyed away from the vertical conveyor onto the main horizontal conveyor at the new level. This manner of operation is repeated for each tray of the row to be moved. During this process, the upper transfer chains 15 must be swung down after each tray has moved off, so as to be clear of the vertical path of travel of the next tray on the vertical conveyor. The lower transfer chains 15 may remain in their projecting position, however, during the whole operation.

When it is desired to lower a row of trays from a high to a lower tier, the operation is reversed. Again the lower transfer chains remain horizontal, while the upper ones must move out of the way each time a fresh tray is transferred to the vertical conveyor. As mentioned above, if the two vertical conveyors are provided, one at each end of the apparatus, no empty storage station need be provided, since the same station can be emptied from one end while it is being filled from the other.

Drive for the transfer chains 15 is taken from their associated horizontal chains 11 by sprockets 18, the direction of travel of the associated chains always being the same. The main drives for the chains 11 are not shown, but will constitute conventional means such as an electric motor with gear or chain or other non-slip connection between the motor and the chains through a suitable controlling device which will determine the chain chosen to be moved at any one time and the position in which each chain comes to a stop. The coordination of the various operations can be carried out manually by manual switching of the motors and other operating parts, or may be controlled by a preset timing circuit of routine type.

The vertical conveyor is driven by a motor 19 through intermittent drive 20 which allows the conveyor to stop for a sufficient length of time for removal of a tray and swinging of the upper transfer chains 15. The spacing between pairs of projecting arms 17 corresponds with the spacing between tiers of the horizontal chains 11, so that individual control is not required for movement of trays to and from each tier. The vertical conveyor will automatically pause at the right position and for the correct length of time during each transfer operation.

FIGURE 3 illustrates the manner in which the trays 7 in the upper tier, that is at the sorting station, are moved into and out of position for receiving letters from the sorter. Two projections 21 are formed in spaced relation on each side of each of the trays 7. Two rods 22 extend beneath the trays, parallel and between each pair of chains 11. Each of these rods is controlled by an hydraulic cylinder or solenoid 23. Rods 22 have rigid arms 24 arranged at spaced intervals along them, the spacing being such that one such arm lies in register with each of the projections 21 on the trays 7. When it is desired to move the trays to an article-receiving position closely adjacent the sorting belt 3, that is, into the true sorting station, the rod 22 furthest from such belt 3 is rotated clockwise by its cylinder 23 to bring its arms 24 to bear on the projections 21 of the trays 7, as seen in FIGURE 3, to move such trays into the solid line position of FIGURE 3. When it is desired to return the trays to the withdrawn position, which is necessary before the chains 11 are moved, the cylinder 23 associated with the rod 22 nearer the belt 3 is energized to rotate such rod anticlockwise, which brings the arms 24 associated with such latter rod into engagement with the other projections 21 to slide the trays 7 away from the belt 3 and into the withdrawn position partly illustrated by the broken lines in FIGURE 3.

The stops 12 hold the trays 7 with a sliding fit, sufficient to permit this movement, preventing any twisting of the trays out of alignment or movement of the trays longitudinally of the chains. If found necessary, the stops 12 may include projections which engage lightly grooves in the sides of the trays, in order to prevent any movement of the trays until these are positively moved by mechanisms for this purpose. Such slots would be sufficiently shallow to permit the stops to swing clear of them when the trays travel from chains 11 to chains 15.

Figure 4:
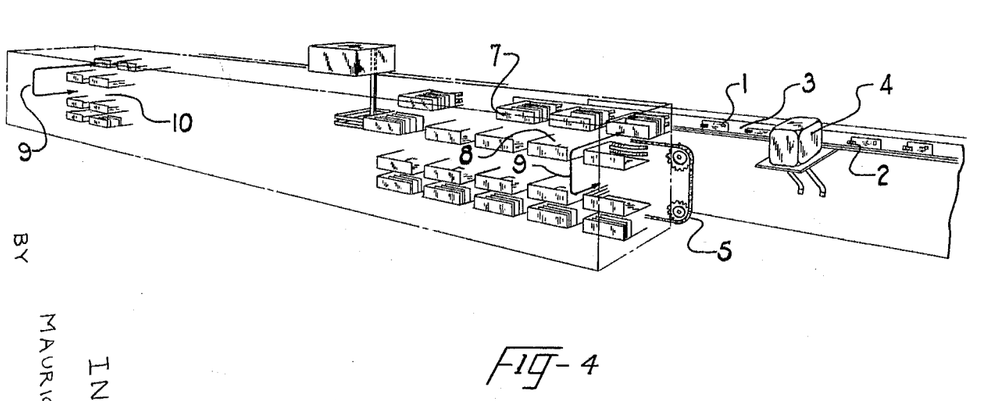
FIGURE 4 is a general view similar to FIGURE 1 showing a modified machine.
Figure 5:
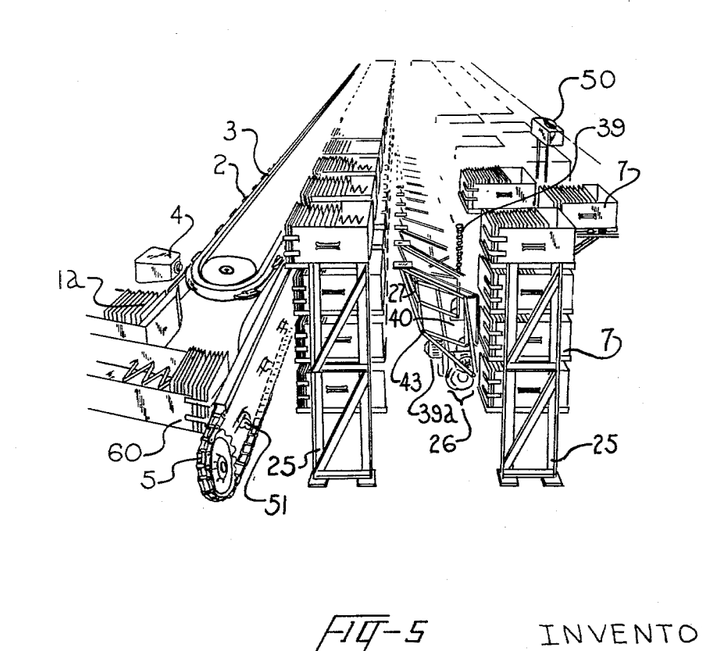
FIGURE 5 is an end, perspective view of the form of apparatus of FIGURE 4, showing more detail.
Figure 6:
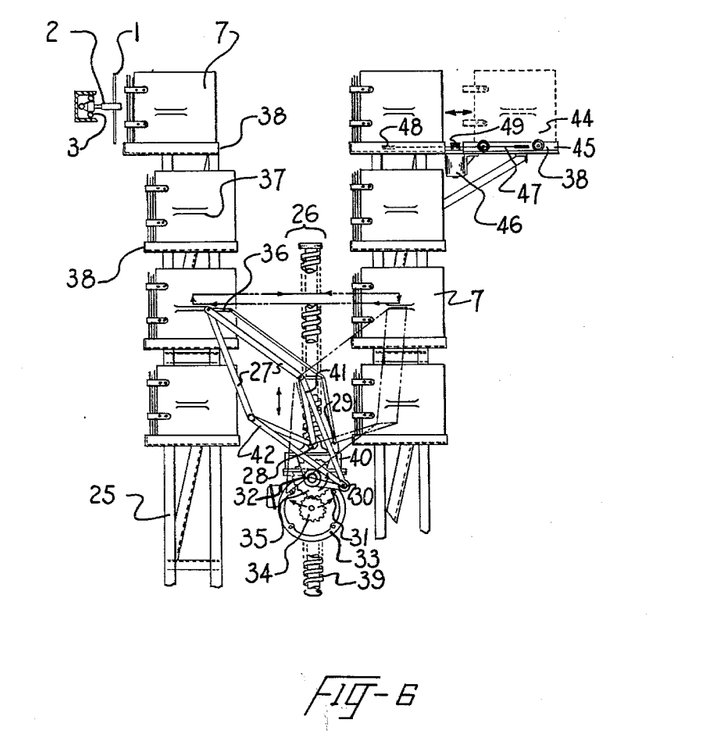
FIGURE 6 is an enlarged view of a portion of FIGURE 5.

In the construction shown in FIGURES 1 to 3, the trays 7 are moved in a direction parallel to the sorting belt 3 during transfer to and from storage; in the alternative construction shown in FIGURES 4 to 6 the trays are moved backwardly from the belt 3 (see the arrows 9 in FIGURE 4), lowered to the level of an empty storage station, and then returned horizontally into storage position. The apparatus for performing these functions is shown in detail in the FIGURES 5 and 6.

The trays 7 are stored in two storage racks 25 located in spaced parallel relation to, and both on one side of, the sorting belt 3. Units 25 comprise tray holders 38 arranged in parallel tiers and defining the sorting station and a number of storage stations. Between the racks 25 is a series of transfer mechanisms generally designated 26. Each transfer mechanism takes the form of a parallelogram linkage 27, 41, 42 mounted at pivot points 28, 29 and 30. Pivot points 28 and 29 are formed on fixed support 40 and pivot point 30 is situated on the end of a crank arm 31 rigidly fastened to a shaft 32 which is rotated by a motor 33 through gears 34 and 35. Rotation of the shaft 32 and its crank arm 31 causes the remote end of the linkage to oscillate back and forth in a horizontal straight line, as demonstrated in FIGURE 6. This remote, oscillating end of the linkage mechanism carries a lifting plate 36 which is adapted to slide between a pair of lifting tabs 37 that project from each side of each of the trays 7.

Each transfer mechanism is mounted on a lead screw 39 so that, once a pair of the plates 36 has been placed in position between the tabs 37 on each side of a tray 7, the lead screw 39 is rotated by a motor 39a sufficiently to raise the engaged tray above its holder 38. Rotation of shaft 32 then moves the lifted tray horizontally to a central position. The assembly is then again raised or lowered, as desired, by appropriate rotation of the lead screw, until the lifted tray is opposite the tray holder 38 into which it is to be placed at the selected level. Shaft 32 is then further rotated or counter-rotated, depending upon which of the storage racks 25 is to receive the tray, so that the tray is moved into position in the empty tier. A slight rotation of the lead screw then lowers the tray into its new holder 38.

Any individual tray or any row of trays may thus be moved from one level to another and/or from one rack to another. Normally it is desired to move a whole row of trays at the same time. In practice it is convenient for mechanical reasons to divide the trays into groups, of say ten trays, and to link the transfer mechanisms for each of the trays in a group. Only the two end parallelogram linkage mechanisms of each group, or of the whole apparatus, if independent operation of the groups is not required, need have arms 41 and 42 connecting the pivot point 30 to the remainder of the linkage. A rod 43 can extend the full length of each group or of the apparatus to interconnect the linkages. One set of gears 34 and 35 can be mounted at one end of the channel 40 to drive the shaft 32, this shaft extending beneath the support 40 to the opposite end of each group or the apparatus, where a second arm 31 is placed. Preferably two lead screws 39 are provided for each group of parallelogram mechanisms, and the motors 39a are connected in parallel.

As FIGURE 6 best demonstrates, the top row of tray holders 38 which supports the trays 7 at the sorting station is offset from the remainder of the holders 38 towards the belt 3 in order that the trays in these offset holders should be in position to receive the letters 1 from the traps 2, while the remainder of the trays 7, those in storage, are clear of the sequencing chain 5 (see FIGURE 5). The latter figure shows a feeder 1a and electronic reader 4 at the near end of the apparatus. It is to be understood that these latter parts are associated with the left hand span of belt 3, as seen in FIGURE 5, for which if need be a further set of trays 7, storage racks and transfer mechanisms (not shown) will be provided. The right hand span of belt 3 which cooperates with the trays, racks and transfer mechanisms shown, is fed by another similar feeder at the far end of the apparatus. In practice, for reasons later explained, both spans of the belt are used whenever possible to make the machine "double." This applies also to the form shown in FIGURES 1 to 3.

The holders 38 in the top row of the racks 25 remote from the belt 3 (top right hand portion of FIGURES 5 and 6) incorporate a feature not present in the other holders. Alternate holders 38 in this row are mounted on wheels 44 set on tracks 45 so as to be movable rearwardly, out of alignment with the remainder of the trays and holders in the same row. Each of these movable holders 38 is controlled by a motor 46 driving a belt 47 extending between pulleys 48 and wrapped around a drive pulley 49 on the shaft of the motor 46. The purpose of this movement of these trays is to provide spaces between alternate trays in the row to allow operation of a conventional overhead bundling machine shown generally at 50.

Coordination of the various operations explained in connection with FIGURES 5 and 6 to move trays from one storage station to another can be achieved either by manual control of each successive operation or by partly or fully automatic means of known type.

The embodiment of the invention shown in FIGURES 4 to 6 uses trays rather shorter than those shown in FIGURES 1 to 3. These shorter trays are intended mainly for use with bundling machines where it is impractical to bundle batches of letters as large as those obtained in the long trays. Short trays are also well adapted for the type of transfer movement adopted in the machine shown in FIGURES 4 to 6, although either long or short trays may be used in either of the types of machine shown in FIGURES 1 to 3 or 4 to 6.

Figure 7:
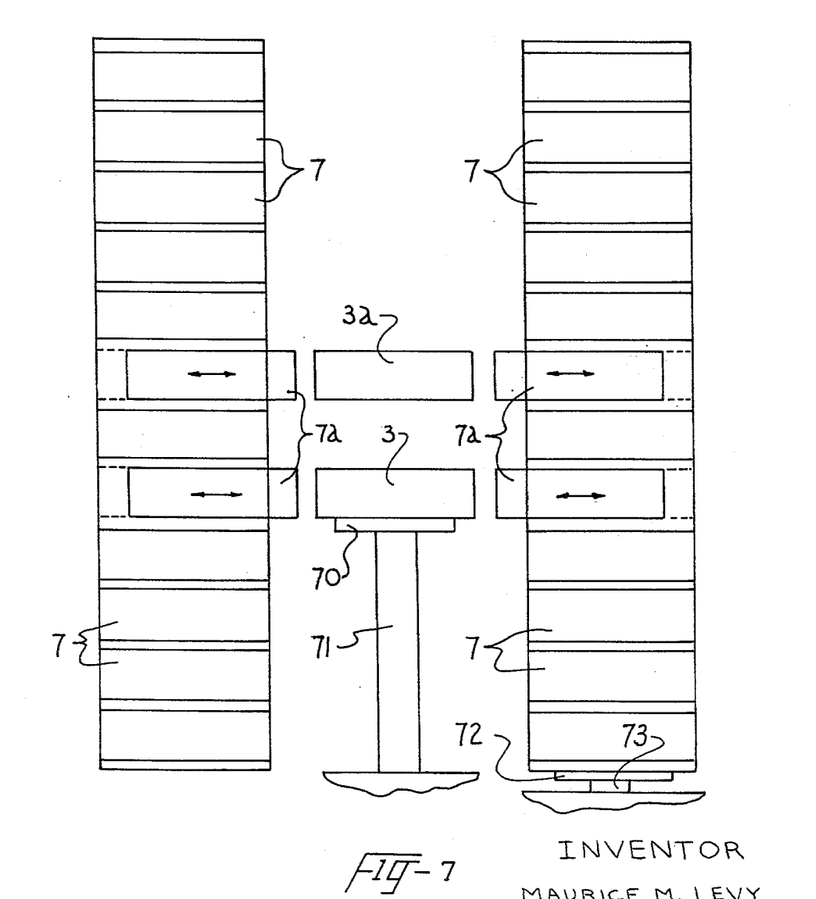
FIGURE 7 is a diagram illustrating operation of apparatus in accordance with the invention.

FIGURE 7 shows diagrammatically a machine similar in principle to the one shown in FIGURE 1. This apparatus has twelve tiers on each side of the sorting belt 3. The trays 7a in the row at the sorting station are moved closer to the belt 3 than the trays 7 in the storage station, in order to be in position to receive letters from the sorter. This machine is "double" in the sense that both spans of the belt 3 are used. It also shows another optional feature, namely duplication of the belt 3 by use of a second sorting belt 3a, similar to the belt 3 and placed at the level of another row of trays. This second level will then provide a second sorting station adjacent each span of belt 3a and letters can be fed simultaneously at the two different levels to trays of two different rows. It will also be necessary to duplicate the feeding and related equipment of belt 3a.

Figure 8:
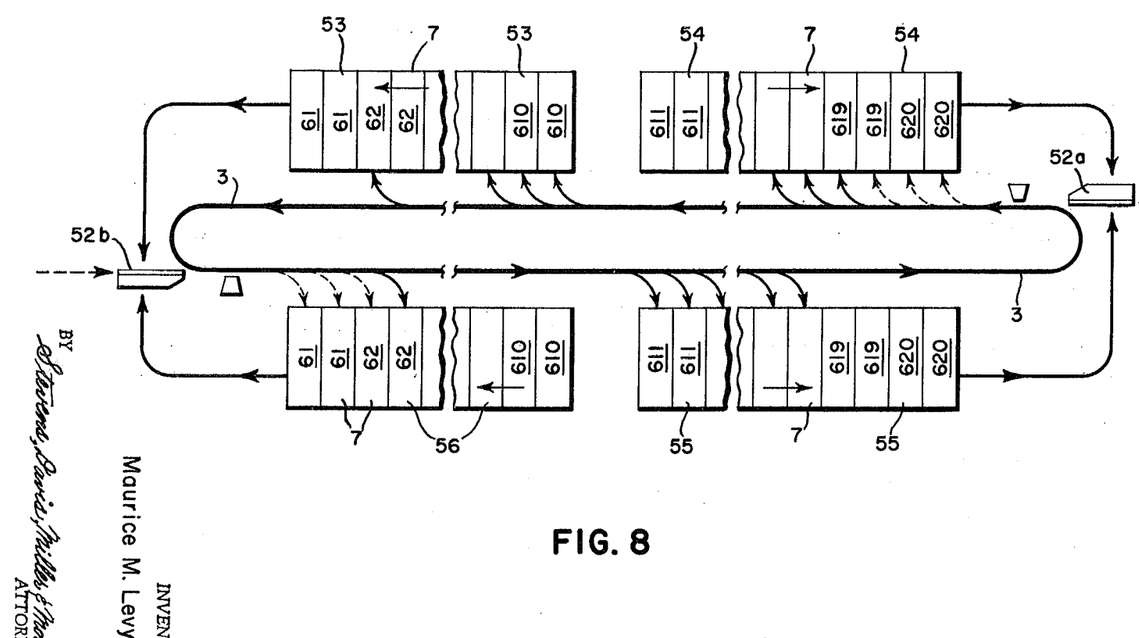
FIGURE 8 is a diagram simulating a view in a horizontal plane at the sorting station of a multi-tiered double sorting machine operating in accordance with the invention.
Figure 9:
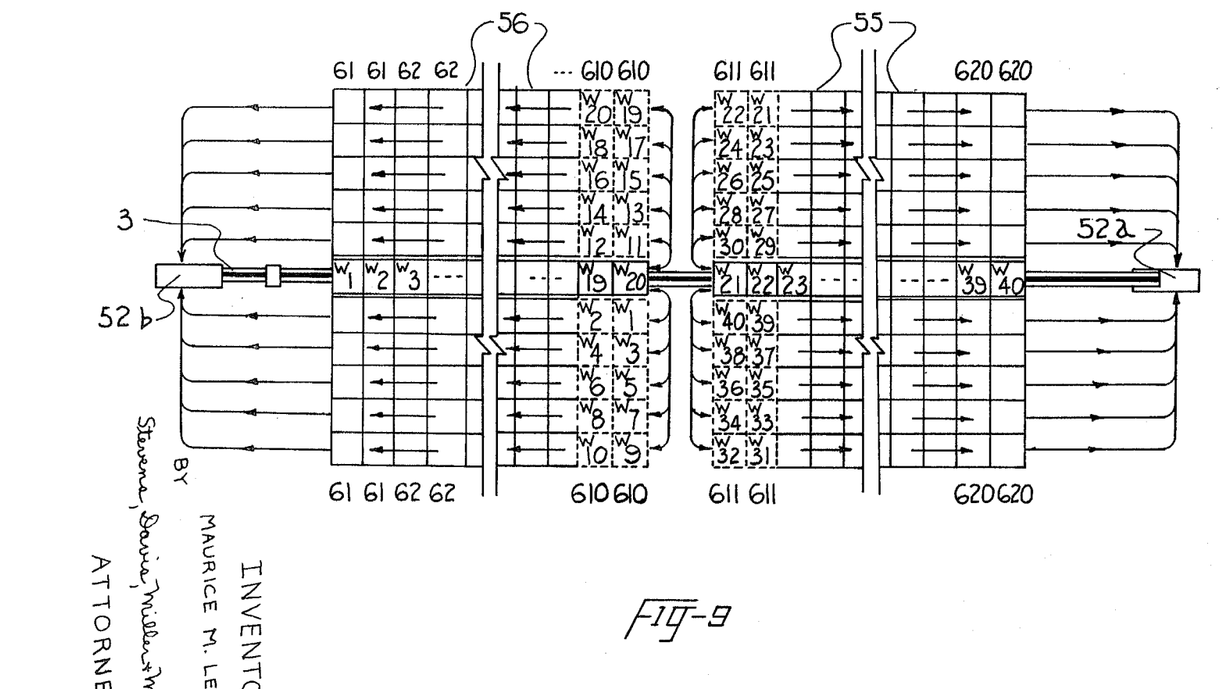
FIGURE 9 is a diagram simulating a side view of the machine of FIGURE 8.

FIGURE 8 shows a machine similar to that of FIGURE 7 (but excluding the additional sorting belt 3a). Both spans of the belt 3 are actively employed, feeder 52a feeding letters along one span and feeder 52b along the other. On each side the trays 7 are divided into two units 53, 54, 55 and 56. FIGURE 9 is a side view showing the ten storage tiers and one sorting tier. FIGURE 8 shows just the trays at the sorting station, the arrows moving from the belt 3 towards the trays 7 indicating the travel of letters from the belt to those trays.

To explain the flexibility of this apparatus, it is prepreferred to consider a specific example. Assume that it is desired to sort a large quantity of mail into 800 mail carriers' walks served by one Post Office. The mail will arrive in the Post Office from early afternoon until about midnight. It will normally have been sorted into carrier walks by early the next morning. One solution is to use a sorter with 800 outlets, but such a sorter will have to be large and occupy much space, and will be consequently costly. In addition, in all known sorters having a large number of outlets, such as 800, each outlet feeds into only a comparatively small storage space, where only a small fraction of the mail for any carrier walk can be stored. It follows that these 800 storage spaces have to be emptied frequently and the contents moved to larger storage containers. The apparatus of FIGURES 7, 8 and 9 is designed to eliminate such disadvantages.

As a first sort, the mail is fed through both feeders 52a and 52b and sorted into twenty groups G1, G2, . . . G20, each group containing the mail for 40 carrier walks each. Feeder 52a feeds 40 trays, divided for convenience into two units 53 and 54, each unit containing 20 trays. The computer is arranged to send the first carrier walk group G1 to the last tray in the sorting row of unit 53 until it becomes full. A switch (not shown) is then operated by the compressed mail in this tray, such switch (not shown) acting on the computer (not shown) to provide that all mail for carrier walk group G1 now goes to the second last tray. The trays of unit 53 are thus grouped in pairs, each pair corresponding to one of the first ten groups of carrier walks G1 and G10. The next ten groups of carrier walks G11 to G20 are distributed simultaneously and in a similar manner to the 20 trays in the sorting row of unit 54. At the same time a similar distribution between the 40 trays in the sorting rows of units 55 and 56 proceeds for mail fed through feeder 52b. FIGURE 8 shows the machine at this stage, what may be considered as the first run of the first sort.

When the trays in the sorting rows of units 53 and 54 (or units 55 and 56) are generally quite full, feeding through the associated feeder 52a (or 52b) is interrupted momentarily, either manually or automatically, as desired. The trays at the sorting station of the units are then moved into a storage station while the empty trays of another row are brought into sorting position. Feeding then restarts and this operation continues through ten runs until all the mail available has been stored in a series of rows of trays. Assuming the trays are transferred to storage by endwise circulation in the manner of FIGURES 1 to 3, the two trays containing G1 mail at the end of unit 53 will be brought up and along to occupy the front positions in each storage tier. FIGURE 9 demonstrates this condition with the designations G1, G2 etc. above each column of trays which hold corresponding mail. Since 10 runs were made, with two trays filled with G1 mail each run, a total of 20 trays, or 2 columns of 10 tiers, now contain G1 mail. The same conditions will apply in unit 56, and in units 54 and 55 to G20 mail. While groups G1 and G20 have been taken as examples, it will be understood that the other groups will have been simultaneously and similarily stored in 2 columns of trays.

The second sort then begins, the aim of this second sort being to divide each group into its individual carrier walks. The contents of the trays in the first two left hand columns of units 53 and 56 are transferred to sorter 52a, while the contents of the last two columns on the right of units 54 and 56 (group G20) are transferred to feeder 52b. It is a relatively easy matter, as FIGURES 1 to 3 demonstrate, to move just the two end trays of any row onto the vertical conveyor to bring them as near as possible to the feeder and to a convenient height for manual or automatic transfer to the feeder. Once these two trays have been emptied into the feeder, they are moved back into their initial positions and the two end trays of another row are moved into suitable transferring position. This continues until all the 20 trays from the two left-hand end columns of units 53 and 56, that is all the trays containing mail of group G1, and all the 20 trays from the two right-hand end columns of units 54 and 55 (all the mail in group G20) have been emptied into the respective feeders. During this time, feeder 52a will have been in operation sorting all the mail of group G1 into its forty walks W1, W2 ... W40 and feeder 25b will have been sorting all the mail of group G20 into its forty walks W761, W762 ... W800. FIGURE 9 shows the mail for walks W1 to W40 divided into the 40 previously empty trays at the sorting station fed by feeder 52a. As soon as this run has been completed, the trays charged with the mail for walks W19 and W20 are moved up to the top tier of unit 53, the two empty trays which previously held the group G1 mail of this top tier being moved down to occupy the two first positions at the sorting station, these two first positions being vacant because the movement of the last two trays with mail W19 and W20 up to the top tier will have been accompanied by movement of all the trays at the sorting station two spaces to the right.

This brings the two trays filled with mail for walks W17 and W18 to the end and these are moved into the last two spaces of the storage tier second from the top, the two empty trays of this second tier which previously held the G1 mail being moved down into the sorting station. This process continues, until all forty trays formerly at the sorting station have been moved into the last two columns of the unit as shown in FIGURE 9. The entire sorting station of unit 53 will now have empty trays occupying it.

While this operation has been going on, a similar operation has been proceeding in unit 54 with carrier walks W21 to W40 being moved into storage in the first two columns. Units 55 and 56 will simultaneously have been operated to sort and store carrier walks W761 to W800 in a like manner on the other span of the machine.

Feeding of feeder 52a with the mail for group G2 can now commence for division in walks W41 to W80, in a like manner to that described in respect of group G1. At the same time, group G19 will be fed to feeder 52b for division into walks W721 to W760.

When the group G2 mail has been sorted into walks W41 to W80, the trays holding these walks are moved up into the storage tiers in a like manner to that already described in respect of walks W1 to W40, the trays containing walks W1 to W20 being moved each two spaces to the left in their respective tiers, and those containing walks W21 to W40 two spaces to the right to make room for the trays carrying walks W41 to W60 (in unit 53) and W61 to W80 (in unit 54). This process continues until all the mail has been sorted from groups to walks and all the storage stations of the machine have been filled or at least charged (the word "charged" is preferred as not implying that the trays necessarily become full) with mail sorted into walks.

The present apparatus is adapted to the use of large trays, if necessary, from which it is apparent that the capacity of these trays may be arranged to hold all the mail allotted to each carrier walk. Alternatively, two trays can be allotted to some walks, with corresponding programming of the computer. The average number of letters in a carrier walk is of the order of 1200, and this requires a tray of about four feet in length. Trays of such length can easily be manipulated in apparatus of the present type. If desired, a telescopic tray may be used. With the 800 trays shown in FIGURE 9, the apparatus there illustrated can store and sort approximately 800×1200 which equals 960,000 letters. This represents almost the total amount of daily incoming mail in a typical large Post Office. With a speed of feeding of twelve letters per second in each feeder, the machine can accept a flow of 24 letters per second, or approximately 70,000 letters per hour, allowing about 5% time wasted for movement of trays into and out of storage and refilling of the feeders. It will be appreciated that many operations here described as consecutive will be capable of simultaneous performance by a skilled operator. Seventy thousand letters per hour is about the peak hourly incoming flow at the main Post Office in Washington, D.C., for example, and it can be seen therefore that one machine of the type described herein could deal with the present rate of mail flow in one of the largest Post Offices in the United States.

It might at first sight be thought that the use of what is here referred to as a "double" machine (that is one using both spans of the belt 3 and having two separate feeders 52a and 52b) represents a mere duplication of one span of such machine; in other words that it (the double machine) could sort twice as many letters as a single machine in a given time, that is have double the throughput, only at the expense of duplication of equipment. However, as the analysis below will demonstrate, this is not so. Quite apart from the fact that both sides of the machine share a common belt 3 with its associated letter traps or other letter propelling devices, the double machine (and this fact holds for two independent single machines not sharing a common belt but employing cross-feeding—a term that will be more fully explained below) in fact achieves a double throughput of letters with only slightly more accumulators than a single machine would have to have to effect the same sorting breakdown, yet at half the throughput.

This effect can best be explained with the aid of algebraic representation of the various variables.

For this purpose let:

$B$ = total number of breakdowns required, for example the 800 walks.

$N$ = number of outlets per machine span; in this example, this number is 40 ignoring the sub-division of each span into 2 units each of 20 outlets, which subdivision is made for mechanical convenience but is not fundamental to the mathematical consideration which follows; when two spans are used it is assumed that they each have the same number of outlets.

$S$ = number of spans—1 for a single machine—2 for a double machine—4 for two double machines, and so on.

$T$ = number of tiers of storage stations necessary, associated with each span.

$M$ = number of groups into which the breakdowns B are divided for the first sort; in the example above M is 20.

$C$ = number of columns of the tiers T shared by a common group just prior to the second sort.

If the machine illustrated in FIGURES 8 and 9 were used as a single machine (operating only units 53 and 54), the value of C in the example above would be 2 (2 columns of group G1 etc.); when the full machine is operated, the value of C becomes 4 (2 columns of group G1 in unit 53 and 2 of group G1 in unit 56 and likewise for each of the other groups).

Now the size of the equipment is principally determined by two of these factors, N and T. The number of outlets, N, determines the length of the machine and hence the number of trays or other accumulators per row, while the number of tiers, T, determines the height of the machine and the number of rows of trays or other accumulators required. The total number of accumulators required is $SN(T+1)$, this being the number of spans, by the number of outlets per span, by the number of storage tiers plus one, this extra one being the row of accumulators at the sorting station. Clearly the principal criterion is to keep this factor $SN(T+1)$ as low as possible for a given throughput, or alternatively, to obtain maximum throughput, for a given value of this factor.

Now certain numerical relationships exist between the variables defined above. For example M, the number of groups must be at least as great as $$\frac{B}{N}$$

(the total number of breakdowns, divided by the number of outlets per span), otherwise, at the second sort into walks, there would be more walks per group than outlets. This problem could only be solved by having a third sort, which would be a very inefficient use of the machine. It is a primary premise of the present discussion that the machine is to be used at the maximum efficiency practicably obtainable. Reduction in the size of equipment can always be obtained by increasing the number of sorting stages, but this becomes very uneconomical in time, and in the long run reduces the throughput out of proportion to the reduction in machine size.

Thus M must be at least as great as $$\frac{B}{N}$$

Since, as will appear more clearly later, the smaller M is chosen, the better, in practice M is made equal to $$\frac{B}{N}$$

This corresponds with the example above, where $M=20$, $B=800$ and $N=40$.

During the first sort, if the number of groups (M) is less than the total number of outlets (SN) (and this must necessarily be so when $S=2$ or more, because M can never exceed N), then a plurality of outlets will be shared by a single group. Since the fundamental purpose of the arrangement of the machine is to obtain the highest available efficiency, it is logical to choose M as an exact submultiple of SN, so that each group will have the same number of outlets. (It must be appreciated that, while such an assumption as this is essential to a manageable mathematical demonstration of the inherent ability of the present machine to operate at high efficiency, in practice some measure of this assumed symmetry could always be sacrificed to suit any particular set of circumstances—such as one or more groups of walks habitually receiving substantially more mail than other groups—without detracting from the essential merit of the system.) Let it therefore be assumed that M is chosen as an exact submultiple of SN (as in the example when $M=20$ and $SN=80$), then the number of outlets sharing a common group during the first sort will equal $$\frac{SN}{M} \text{ (in the example } \frac{80}{20}=4$$

the two right-hand outlets of both units 53 and 56 in FIGURE 8 which all receive group G1 mail). Since these outlets will be used in the same way for each run of the first sort and the charged accumulators from each run will be transferred to the respective storage tiers, the final result at the end of the first sort will be a number of columns sharing a common group equal to the number of outlets sharing a common group. In other words, $$C=\frac{SN}{M}$$

It will be evident that, since the number of accumulators to be moved up into storage stations after the first run of the second sort (trays W1 to W20 in units 53 and 56 and trays W21 to W40 in units 54 and 55 in FIGURE 9) equals the number of outlets (80 in all four units), and since space must be made for this number of accumulators by moving down into the sorting stations a like number of now empty accumulators, the same number of accumulators must have been emptied for the first run of the second sort. In other words, the same number of accumulators must have contained mail of the groups sorted during such first run (group G1 in units 53 and 56 and group G20 in units 54 and 55). Thus, in the double machine shown in FIGURES 8 and 9, 80 accumulators must have been emptied prior to the first run of the second sort. Otherwise there would have been no storage space for the 80 accumulators charged during the first run of the second set. In the general case, this amount (the number of accumulators emptied) is equal to SN (the number of accumulators recharged).

This number (SN) of emptied accumulators must have been arranged in columns and tiers, so that, in the example, $SN=2CT$, since the accumulators contained two groups (G1 and G20), and C is defined as the number of columns of tiers per group. In the general case $SN=FCT$, where F is the cross-feeding factor, that is to say the number of groups that, sorted in the same span during the first sort, can be fed simultaneously during the second sort. In the example, groups G1 and G20 are both sorted in the same span (units 53 and 54) during the first sort, and simultaneously in different spans (units 53, 54 for G20, and units 55, 56 for G1) during the second sort. Also, of course, these same groups are both sorted in units 55 and 56 during the first sort, and then split between the two spans for the second sort, which demonstrates the symmetry of this cross-feeding method. When two groups are thus split up, the cross-feeding factor is equal to 2, as we saw in the equation $SN=2CT$.

It will be further apparent that F, the cross-feeding factor is necessarily equal to S, the number of spans, except that F can never exceed M the number of groups. Taking the extreme example, and assuming ten double machines were used, that is $S=20=F=M$; during the first sort each machine would still divide into the 20 groups, 2 accumulators per group (assuming N is kept constant at 40), and then each of the twenty spans would take one group and divide it into its 40 walks during the second sort. In other words all the 20 groups from the first span would be sorted simultaneously during the second sort. This is the definition of F, the cross-feeding factor, and consequently this factor would be 20 in the extreme example taken where 20 spans were used. If any intermediate example is taken, it will be found that $F=S$, provided S does not exceed M.

The equation $SN=FCT$ can thus be reduced to $SN=SCT$ or $N=CT$.

The general equations so far derived are as follows:

$$M=\frac{B}{N} \quad (1)$$

$$C=\frac{SN}{M} \quad (2)$$

$$N=CT \quad (3)$$

Solving these equations for T, produces the result:

$$T=\frac{B}{SN} \quad (4)$$

When $S=2$, $B=800$ and $N=40$ as in the example, $T=10$ which agrees with FIGURE 9.

However, if only a single span were used, no cross-feeding would be possible and S would equal 1, when T would have to be 20.

It may perhaps seem to have been unnecessary to employ the foregoing analysis to prove that 20 storage tiers would be necessary with only a single span of 40 outlets, since obviously there must be as many accumulators as total breakdowns, and in the example 800 breakdowns were needed. This can be stated algebraically by saying that SNT must be as great as B which is supported by Equation 4, but nevertheless it is believed to have been useful to have derived the above equations, because the simple argument that SNT must be as great as B does not, of itself, preclude the possibility that, under some circumstances SNT might not have to be greater than B. The derivation of Equation 4, however, which equates SNT to B thus provides more information about the conditions than does the simple argument that there must be enough accumulators to store all the breakdowns.

The equations derived tell us quite a good deal more than could be assumed. For example, Equation 4 was used to show that, for a single machine, when $S=1$, $T$ must be 20. In arriving at this conclusion N was retained at the value of 40. Alternatively, the need to increase T to 20 could be avoided by increasing N to 80. (It is doubtful if this would have any practical advantage, as it amounts to making a very long, single span machine, instead of dividing the length into two spans of 40 outlets each, but nevertheless, the proposition is interesting as a demonstration of the utility of the equations derived.) Certainly Equation 4 would yield a value of $T=10$ if N were made 80, while B remains at 800, S being 1. But, if this were done M, the number of groups, would have to be changed, since Equation 1 requires $$M = \frac{B}{N} = 10$$

in the present example. The 800 breakdowns would then have to be divided into 10 groups of 80 walks each. Such an arrangement would work, even though the length of the machine would in itself represent an inefficient use of space; moreover only half the throughput could be obtained.

Now, let us use the equations to consider the other extreme, briefly postulated above, namely the use of ten double machines, that is $S=20$. Equation 4, with B and N kept at 800 and 40, then gives a value of $T=1$. In other words each span then would only need one storage tier, and this will be found to be correct if the layout and operation of twenty such spans (assuming cross-feeding between all spans) is considered.

Earlier in this discussion, it was pointed out that the total number of accumulators required is $SN(T+1)$. Inserting T from Equation 4 in this expression, gives the total number of accumulators as $$SN\left(\frac{B}{SN}+1\right)$$

or $$B+SN$$

In other words, except for the term SN, which represents the accumulators at the sorting stations (while B represents the accumulators at the storage stations), the total number of accumulators is independent of S. Thus, more spans do not represent more equipment, as far as accumulators are concerned, except for the one extra row required at each sorting station. Indeed, if the comparative inconvenience of using at the sorting station in the second sort, the same accumulator trays that have just been emptied of group-sorted mail, can be tolerated, the total number of accumulators can be reduced to B. Normally, to have one set of accumulators kept empty is convenient as minimising wasted operating time and, since the extra number of accumulators involved in this way is not very large, the figure of $B+SN$ is usually employed. But theoretically B is enough, and this is entirely independent of the number of spans. But more spans do represent more throughput, because each span has its own feeder, and all the feeders can be operated simultaneously, the obtainable speed of the feeders being the principal speed limitation. Some sorting time is lost in transferring accumulators to and from storage, of course, but this also is independent of the number of spans, as the transferring mechanisms of the various spans will operate simultaneously.

The conclusion is thus that to increase from one span to two will double the throughput of the machine with very little change in the equipment required. The belt 3 is common to both spans and almost the same number of total accumulators is required. This synergistic effect is only achieved when cross-feeding is employed, of course. If the two sides of the machine were operated independently, double the equipment would be needed for double the throughput.

It follows that four times the throughput can be obtained with two double machines cross-feeding one another, with far less than four times the amount of equipment. This consideration continues as the number of machines is increased except that it becomes less valid in practical terms as the number of machines becomes too large—that is as S approaches M in value and T approaches 1—because a large number of machines with few tiers represents an inefficient use of floor space. Moreover, it must not be forgotten that each machine requires its own expensive equipment, so that, in practice, the greatest advantage obtainable by virtue of the cross-feeding effect resides in the adoption of 2 spans in the same machine (as in FIGURES 8 and 9), rather than in the use of more than one double machine, although, in a very large Post Office for which one double machine is inadequate, the two machines that would be required to double the throughput would exhibit the advantage of the cross-feeding effect by costing less to build than twice the cost of one machine.

As a constructional alternative, the entire sorting unit comprising belt 3 and its associated feeders and driving apparatus can be mounted on a vertically movable platform 70 (FIG. 7) controlled by a hydraulic lift 71 so that the entire sorting unit can be moved vertically to be in register with any one tier of trays 7. This does not eliminate the need to provide transferring means for moving the trays between tiers in the manner required after each run of the second sort, but it would eliminate much of the tray movement carried out during the first sort.

As a further alternative, the trays 7 may be arranged to be movable in columns as by platform 72 and hydraulic lift 73. The arrangement of trays 7 will then be considered as a series of horizontally spaced banks of vertical columns, rather than, as hitherto, a series of vertically spaced tiers of horizontal rows. The effect is the same whichever way the trays are considered to be arranged.

Figure 10:
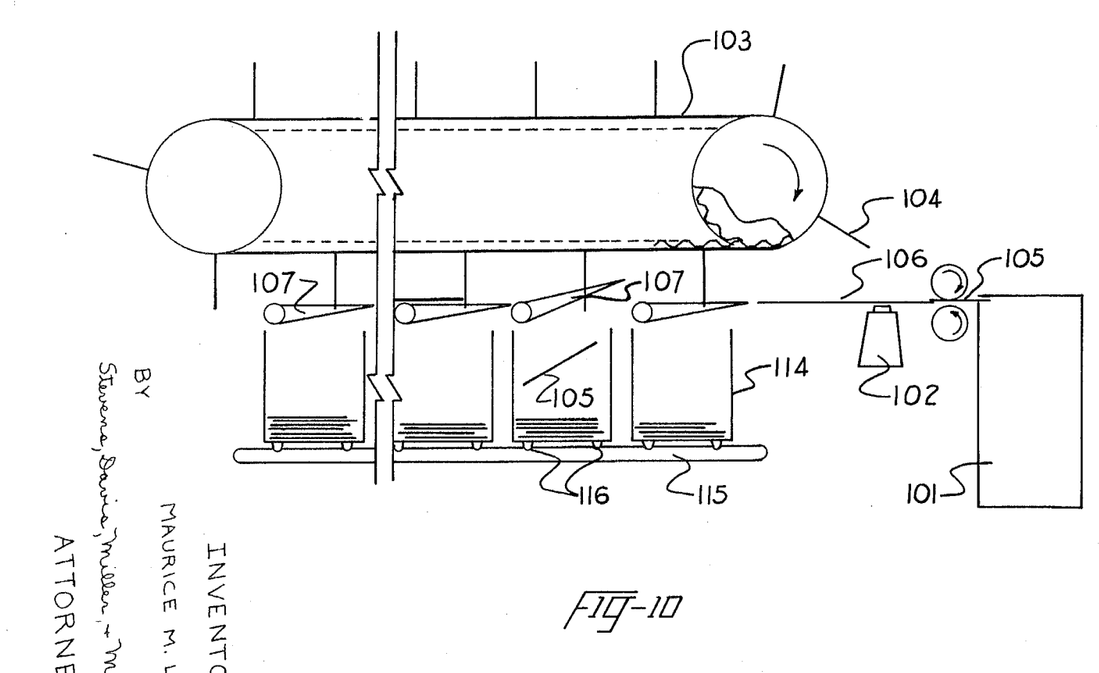
FIGURE 10 is a side view of a further form of apparatus.
Figure 11:
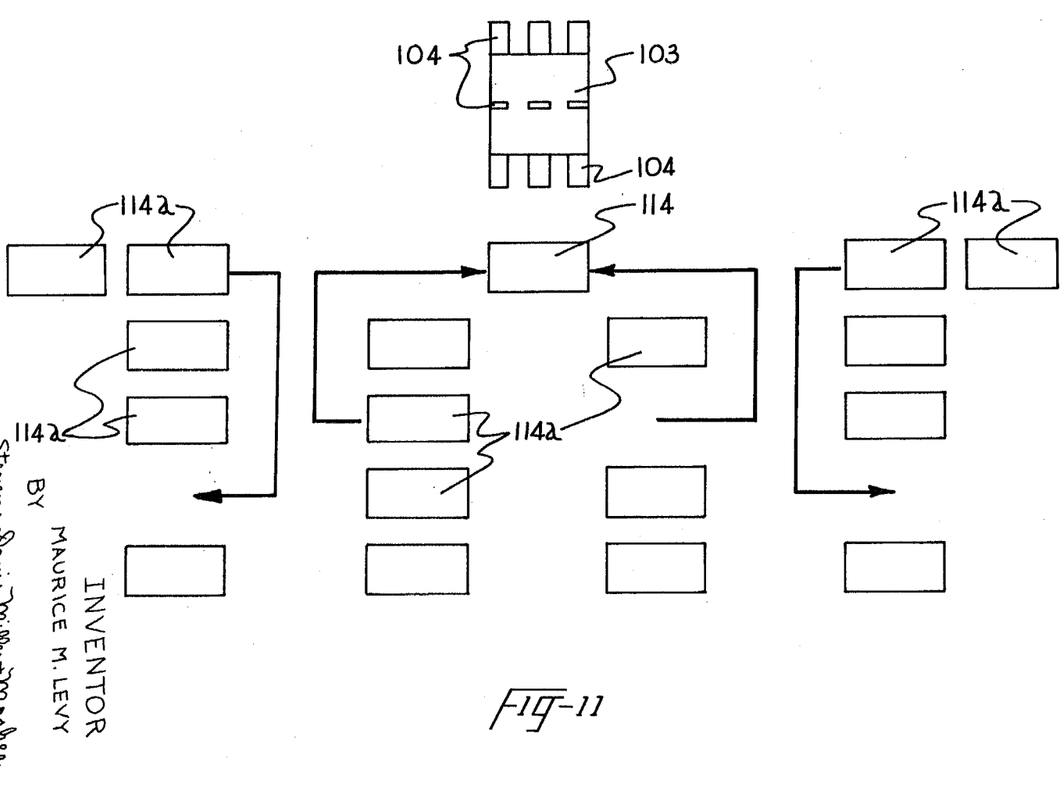
FIGURE 11 is a diagram simulating an end view and illustrating the manner of operation of the apparatus of FIGURE 10.

Yet another form of apparatus is shown in FIGURES 10 and 11. FIGURE 10 shows a feeder 101 feeding letters 105 past a reader 102 onto a sorting belt 103 which, instead of being of the letter trap type, uses attached propelling arms 104 for engaging letters 105 and sliding them along a slide 106 in which deflecting flaps 107 are located at intervals. A number of movable collecting trays 114 is provided in rows. FIGURE 10 shows one such row of trays 114 in position beneath deflecting flaps 107 to receive letters deflected downwardly thereby. These trays 114 are slidably mounted on a fixed plate 115 by means of rails 116 secured to the bottoms of the trays and which engage in complementary grooves in the plate 115.

FIGURE 11 is a diagrammatic end view of the apparatus of FIGURE 10 showing how a number of rows of trays 114 can be arranged. FIGURE 11 shows belt 103 and flaps 107 with a row of trays 114 arranged beneath the flaps. Many other rows of trays 114a are shown in storage stations to the right and left and beneath the row of trays 114 at the sorting station. The arrows in FIGURE 11 represent symbolically the manner in which these rows of trays can be moved around from storage to operative position. The means employed for effecting such movement may be of the type illustrated in FIGURE 2 or alternatively in FIGURES 5 and 6.

I claim:
1. Apparatus for sorting code-bearing flat articles comprising a plurality of accumulators each constructed for receiving and retaining said articles, each accumulator being individual and separate and movable relative to the other accumulators, an elongated sorter having an electronic reader and a plurality of sorting outlets, means defining a sorting station extending along said sorter, means mounting a first row of said accumulators at said sorting station with each accumulator in register with a respective sorting outlet, said sorter including means for sorting said articles into said respective accumulators at said sorting station in accordance with a code designation associated with each said article and a feeder for feeding unsorted said articles individually to said sorting means for sorting into said accumulators, means defining a plurality of storage stations, means mounting at least one further row of said accumulators at said storage stations, means for moving said first row of accumulators to transfer said first row from said sorting station to a selected one of said storage stations, and means for moving a second row of accumulators from a storage station into said sorting station to replace said first row independently of the movement of said first row and independently of further accumulators in storage stations.

2. Apparatus according to claim 1, wherein said means for moving said first row of accumulators are arranged to move said row endwise away from said sorting station in a direction parallel to the direction of extent of said sorter.

3. Apparatus according to claim 1, wherein said means for moving said first row of accumulators are arranged to move said row sidewardly away from said sorting station in a direction transverse to the direction of extent of said sorter.

4. A method of sorting a large body of randomly arranged articles into a number of sorting categories, each said article bearing a code designation corresponding at least to a first major breakdown of the articles into groups, and of a final sorting breakdown within said first major breakdown, said method comprising:
(i) feeding a first portion of said body of articles into a first sorter and sorting said articles individually to selected accumulators at a first sorting station in accordance with the group of the code indicated breakdown of each article,
(ii) transferring said accumulators, when charged with articles, to a storage station,
(iii) replacing said transferred accumulators with empty accumulators at said first sorting station,
(iv) continuing to feed and sort said first portion of said body of articles into said empty accumulators at said first sorting station in accordance with the group of the breakdown of each article,
(v) repeating said transferring, replacing, feeding and sorting steps to complete the sorting into groups of said first portion and to build up a first store of charged accumulators,
(vi) simultaneously with the foregoing feeding, sorting, transferring, replacing and repeating steps carried out in association with said first sorting station; duplicating said steps at a second station by feeding a second portion of said body of articles into a second sorter to sort said articles individually to selected accumulators at said second sorting station in accordance with the group of the code indicated breakdown of each article, transferring said last-mentioned accumulators to a storage station, replacing said transferred accumulators with empty accumulators, continuing to feed and sort said second portion into said empty accumulators and repeating said transferring, replacing, feeding and sorting steps associated with said second sorting station to complete the sorting into groups of said second portion and to build up a second store of charged accumulators.
(vii) assembling the articles of a first common group from both the first and second store at a first sorter and feeding said first group articles into said first sorter to sort said articles individually to selected accumulators at said first sorting station in accordance with the final code indicated breakdown,
(viii) assembling from the accumulators of both said first and second store, the articles of a second group, and, simultaneously with the sorting at said first sorting station of said first group articles, feeding said second group articles into said second sorter to sort said articles individually to selected accumulators at said second sorting station in accordance with the final code indicated breakdown,
(ix) transferring to storage stations the accumulators charged at the first and second sorting stations by the last-mentioned sorts,
(x) replacing said transferred accumulators with empty accumulators,
(xi) and repeating said assembling steps for successive groups of articles, repeating the subsequent feeding and sorting steps to sort the articles of said successive groups simultaneously at said first and second sorting stations, and repeating said transferring and replacing steps at each sorting of each of said successive groups to complete the sorting into final breakdowns of all said groups and build up a further store of charged accumulators each containing only the articles bearing a code designation for one of said final breakdowns.

References Cited by the Examiner
UNITED STATES PATENTS 2,160,319 5/30 Swartz ______________ 209—121
2,257,220 9/41 Becker ______________ 209—110
2,265,441 12/41 Maul ________________ 209—110
2,649,231 8/53 Ferguson ____________ 214—7 X
2,993,592 7/61 Mumma ______________ 209—121
3,022,617 2/62 Miller _______________ 53—59

OTHER REFERENCES
I.B.M. Technical Disclosure Bulletin, A. E. Gray and L. A. Wilson, Sorting Machine, vol. 3, No. 4, Sept., 1960, pages 1 and 2.

ROBERT B. REEVES, *Acting Primary Examiner.*
CLAUDE A. LE ROY, ERNEST A. FALLER,
*Examiners.*